United States Patent [19]
Weidman et al.

[11] Patent Number: 5,412,745
[45] Date of Patent: May 2, 1995

[54] FIBER OPTIC COUPLER EXHIBITING LOW NONADIABATIC LOSS

[75] Inventors: David L. Weidman; Donald R. Young, Jr., both of Corning, N.Y.

[73] Assignee: Corning Incorporated, Corning, N.Y.

[21] Appl. No.: 238,384

[22] Filed: May 5, 1994

[51] Int. Cl.$^6$ .............................................. G02B 6/26
[52] U.S. Cl. ...................................... 385/43; 385/51; 385/127
[58] Field of Search ..................... 385/39, 42, 43, 46, 385/48, 50, 123, 126, 127, 51

[56] References Cited

U.S. PATENT DOCUMENTS

| | | | |
|---|---|---|---|
| 4,763,976 | 8/1988 | Nolan et al. | 385/43 |
| 4,795,228 | 1/1989 | Schneider | 385/43 X |
| 4,877,300 | 10/1989 | Newhouse et al. | 385/43 |
| 5,179,603 | 1/1993 | Hall et al. | 385/24 |
| 5,268,979 | 12/1993 | Weidman | 385/42 |

OTHER PUBLICATIONS

W. J. Stewart et al. "Design Limitation on Tapers and Couplers in Single-Mode Fibres", Technical Digest, Fifth International Conference on Integrated Optics & Optical Fiber Communication and Eleventh European Conference on Optical Communication, Genoa, Italy, vol. 1, p. 559 (1985), 4 pp.

*Primary Examiner*—John D. Lee
*Attorney, Agent, or Firm*—W. J. Simmons, Jr.

[57] ABSTRACT

A fiber optic coupler comprising a plurality of single-mode optical fibers, each of which is tapered to form a small diameter section that extends in contiguous relationship with the small diameter sections of the other fibers to form a coupling region. Each of the fibers has a core surrounded by a cladding of refractive index lower than that of the core. At least one of the fibers has a refractive index pedestal of refractive index $n_i$ between said core and cladding, wherein $n_1 > n_i > n_2$, $n_1$ and $n_2$ being the refractive indices of the core and cladding, respectively.

13 Claims, 5 Drawing Sheets

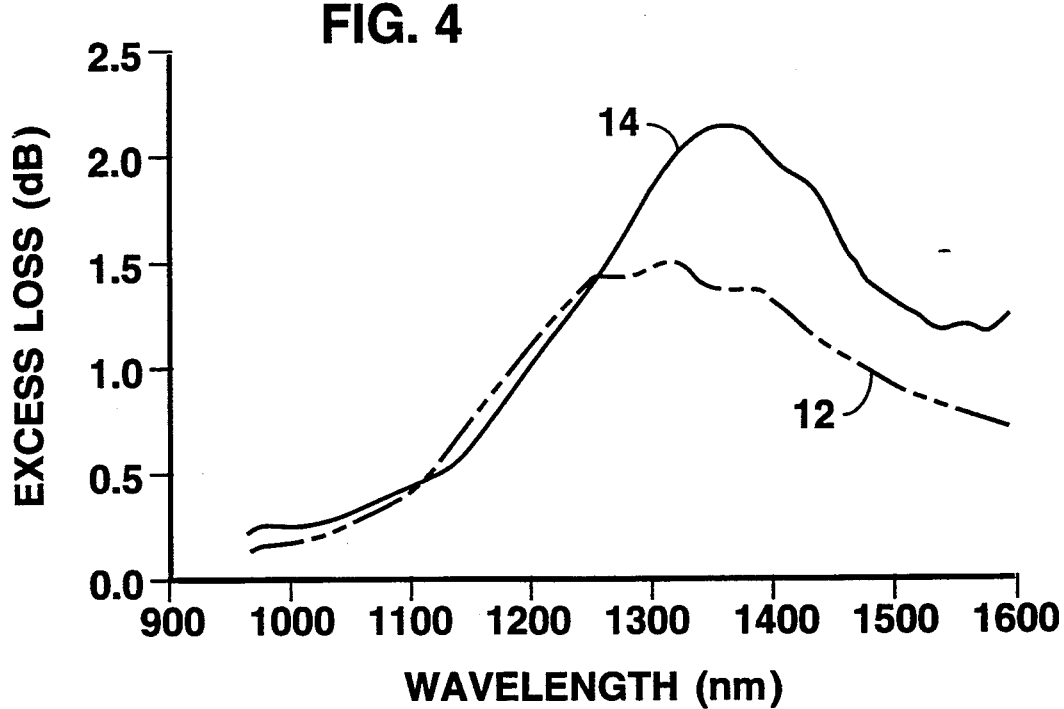
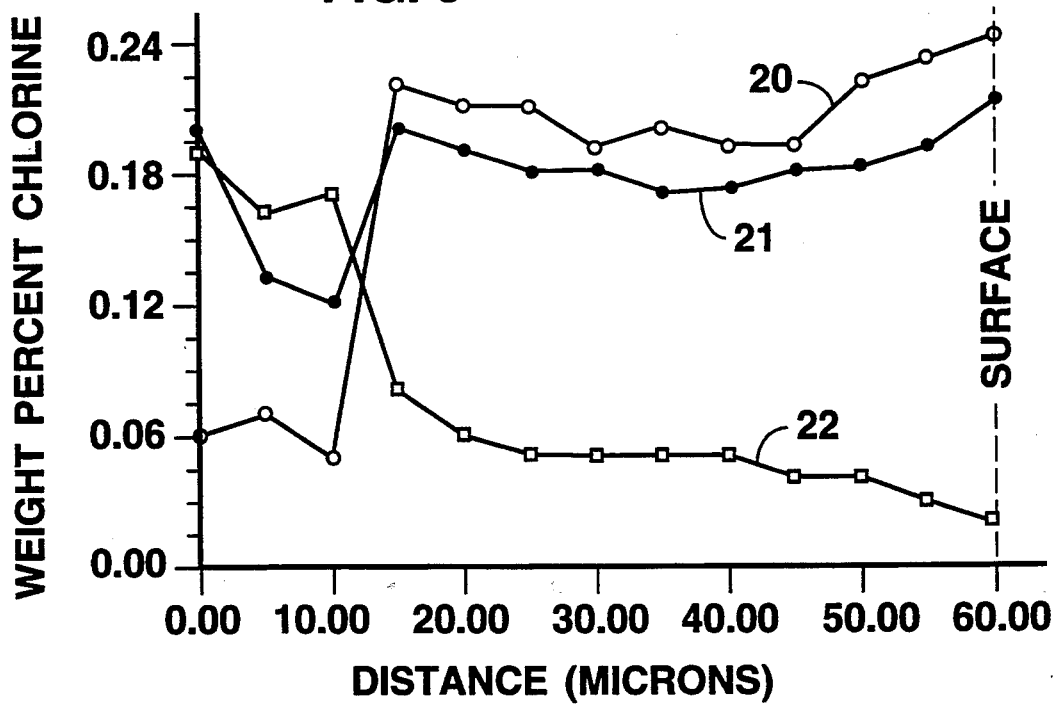

FIBER OPTIC COUPLER EXHIBITING LOW NONADIABATIC LOSS

BACKGROUND OF THE INVENTION

The present invention relates to fiber optic couplers, and more particularly, to couplers that exhibit low values of nonadiabatic-taper-induced excess loss.

This invention relates to fiber optic couplers regardless of their function or physical configuration. The various kinds of coupler function to which the invention applies include achromatic, wavelength division multiplexing, signal tapping, switching and the like. Examples of various configurations are: (a) fused biconic taper couplers that are made by heating and stretching a plurality of coextending optical fibers to fuse and taper them, (b) overclad couplers that are made by inserting a plurality of optical fibers into a tube and heating the tube to collapse it onto the fibers and thereafter stretching the tube midregion, and (c) coextending fiber couplers that are made by heating and stretching a plurality of optical fibers to taper them, and thereafter placing the stretched regions of the fibers adjacent one another to form a coupling region where, optionally, portions of the claddings have been removed by etching, polishing or the like. In the various kinds of couplers the coupling region is surrounded by a medium having a refractive index $n_3$ that is lower than the refractive index of the coupler fiber cladding. The medium can consist of air, glass, plastic or the like.

As the requirements for the optical performance of fiber optic couplers become ever more stringent, the need to eliminate excess loss sources becomes more critical. One such loss source, which can be the dominant loss source in some couplers, is nonadiabatic-taper-induced excess loss.

In the tapered regions of fiber optic couplers the fundamental mode is continuously changing shape to accommodate the changing local index profile. If the rate of change of geometry is too great, the fundamental mode can be coupled to the higher order modes of the coupler index structure. This mechanism is referred to as nonadiabatic mode coupling. While the coupler is called a "single-mode" coupler, that actually refers to the fact that the input and output fibers only support the low-loss propagation of the fundamental $LP_{01}$ mode. The coupler can typically support several bound, propagating modes. However, some of these modes may cut off at some point during the taper, coupling their optical power into radiation modes which are lost as potential coupler output, resulting in excess loss. Other higher-order modes which do not cut off will output their power into higher order modes of the output fibers. These modes suffer high loss and, again, the net impact is power lost to the coupler output and increased excess loss. Typically these nonadiabatic mode coupling effects are wavelength dependent, and excess loss varies as a function of wavelength.

The following symbols are used herein to characterize features of the prior art and/or the present invention. The term $\Delta_{1-2}$ is defined as $(n_1^2-n_2^2)/2n_1^2$, where $n_1$ and $n_2$ are the refractive indices of the fiber core and cladding, respectively. The term $\beta_{CR}$ is used herein to mean the propagation constant of the fundamental mode in a coupler fiber in the coupling region of the coupler. The term $\Delta_{pedestal}$ equals $(n_i^2-n_2^2)/n_i^2$, where $n_i$ is the refractive index of that portion of the fiber just beyond the core (see refractive index dip 10 of FIG. 2 and refractive index pedestal 27 of FIG. 8).

In the refractive index profiles depicted in the figures, no attempt is made to represent indices and radii to scale and/or in exact relative magnitude.

Significant nonadiabatic mode coupling has been observed in a specific type of wavelength division multiplexing (WDM) coupler (referred to herein as a type A coupler) used to couple a signal (at wavelength $\lambda_S$) and the pump power (at wavelength $\lambda_P$) to the gain fiber of a fiber amplifier. One such coupler, which is disclosed in U.S. Pat. No. 5,179,603, functions as both a WDM and a mode field converter. A first coupler fiber has a core matched to a standard telecommunications fiber ($\Delta^{esi}=0.36\%$, $d_c^{esi}=8.3$ μm, mode field diameter=10.5 μm at 1550 nm and 5.7 μm at 1000 nm). The second coupler fiber has a large core-clad $\Delta_{1-2}$ (about 1%), a $d_c^{esi}$ of 3.5 μm, and a mode field diameter that is sufficiently small (6.4 μm at 1550 nm and 3.7 μm at 1000 nm) that it is substantially matched to an Erbium-doped gain fiber. The term $\Delta^{esi}$ is the equivalent step index delta of the fiber, and $d_c^{esi}$ is the equivalent step index core diameter. The two coupler fibers would have possessed substantially different values of $\beta_{CR}$ except that the cladding of the second fiber is provided with an amount of chlorine that is greater than the amount of chlorine in the cladding of the first fiber, whereby the refractive index of the cladding of the second fiber is greater than that of the cladding of the first fiber. The refractive index disparity between coupler fiber claddings causes the $\beta_{CR}$ values thereof to become sufficiently matched that more than 95% of the light power at wavelength $\lambda_S$ couples between the first and second coupler fibers. Because of the manner in which the second fiber is made, its chlorine profile (idealized) is as shown in FIG. 1, and its overall refractive index profile (idealized) is as shown in FIG. 2. It is noted that the refractive index profile of these coupler fibers is determined by both the chlorine and germania doping, the large germania doping level at small radii (<2 μm) forming the inner refractive index peak shown in FIG. 2. The radius of transition between the two chlorine levels is $r_t$, the core radius is $r_c$ and $r_o$ is the outside radius of the fiber.

The refractive index profile (idealized) of the standard telecommunication fiber is illustrated in FIG. 3.

This loss mechanism was observed to be even greater in WDM couplers (referred to herein as type B couplers) made with two identical small mode field diameter fibers of the type characterized by FIGS. 1 and 2. FIG. 4 shows excess loss versus wavelength for types A and B couplers (curves 12 and 14, respectively). In both cases, the variations in loss with respect to wavelength are indicative of possible nonadiabatic loss mechanisms.

It was discovered that type A couplers made with small mode field diameter fibers having a chlorine doping profile represented by curve 20 of FIG. 5 had 0.3 dB higher excess loss than those made with small mode field diameter fibers having a chlorine doping profile as represented by curve 21 of FIG. 5. Except for the cladding chlorine level, all other aspects of the small mode field diameter fibers were substantially identical. Thus, it became apparent that a larger dip in the chlorine profile caused larger coupler excess loss.

SUMMARY OF THE INVENTION

It is therefore an object of the present invention to provide fiber optic couplers exhibiting low levels of excess loss.

Briefly, the present invention relates to a fiber optic coupler comprising a plurality of single-mode optical fibers, each of which has a biconical taper section. The taper sections of the fibers extend in contiguous relationship to form a coupling region. Each of the fibers has a core surrounded by a cladding of refractive index lower than that of said core. At least one of the fibers has a refractive index pedestal of refractive index $n_i$ between its core and cladding, wherein $n_1 > n_i > n_2$, $n_1$ and $n_2$ being the refractive indices of the core and cladding, respectively, of said at least one fiber.

BRIEF DESCRIPTION OF THE DRAWINGS

FIG. 4 shows the spectral excess loss curves for two different couplers.

FIG. 5 shows the chlorine profiles of three different coupler fibers.

which is the maximum value of $\Delta_{pedestal}$ for a given value of $a_{pedestal}$ as determined by a cutoff limitation.

DESCRIPTION OF THE PREFERRED EMBODIMENTS

Discussed herein are the results of experiments involving type B couplers, each coupler being made from two identical high $\Delta_{1-2}$ low mode field diameter fibers. Couplers differed in the amount of chlorine contained in the inner portion of their cladding (at radii less than 10 μm).

The coupler fibers were made by the process disclosed in U.S. Pat. No. 5,295,211 (which is incorporated herein by reference). A porous core preform comprising a core region and a thin layer of cladding glass is formed on a cylindrical mandrel. The mandrel is removed, and the resultant tubular preform is gradually inserted into a consolidation furnace muffle, the maximum temperature of which is between 1200° and 1700° C., preferably about 1490° C. for high silica content glass. Chlorine, which is normally present during the preform consolidation step to achieve drying, may be supplied to the preform by flowing into the preform aperture a drying gas consisting of helium and chlorine. The end of the aperture is plugged to cause the gas to flow through the preform pores. A helium flushing gas is simultaneously flowed through the muffle.

The resultant tubular glass article is heated and stretched in a standard draw furnace while a vacuum is applied to the aperture to form a "core rod" in which the aperture has been closed. A suitable length of the rod is supported in a lathe where particles of silica are deposited thereon. The resultant final porous preform is inserted into a consolidation furnace where it is consolidated while a mixture of helium and chlorine is flowed upwardly through the furnace. The resultant glass preform is drawn to form a single-mode optical fiber. The amount of cladding glass particles applied to the initially formed core preform determines the radius of the chlorine pedestal or dip. The amount of chlorine to which the porous portion of the preform is subjected in the first and second drying/consolidation steps determines the value of $\Delta_{pedestal}$. In the resultant fiber the radius of the germania-doped core was almost 2 μm, and the core-clad $\Delta_{1-2}$ was about 1.0%.

Couplers were formed in accordance with the teachings of U.S. Pat. Nos. 5,011,251 and 5,295,211. The protective coating is stripped from the midsection of one fiber and from the end of another fiber. The two fibers are inserted into the bore of a glass tube so that the stripped portions of the fibers extend through the tube midregion. The fiber bore is evacuated and the tube is heated to collapse the tube midregion onto the fibers. The tube is again heated and the central portion of the collapsed midregion is stretched to form a coupler.

Figure 6:
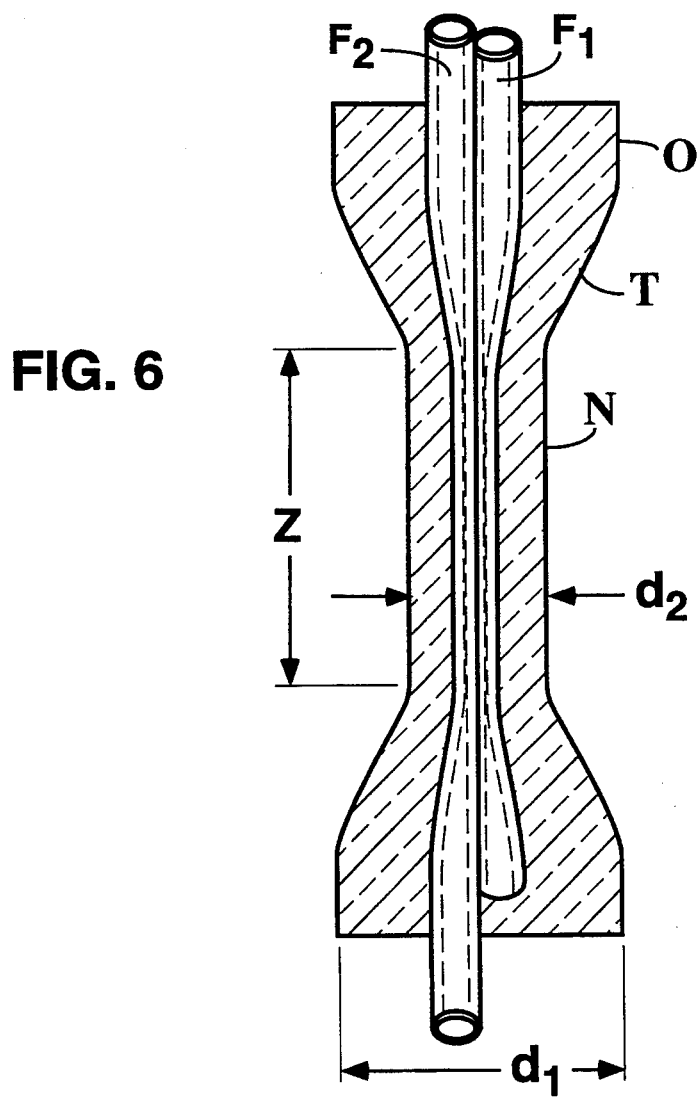
FIG. 6 is a cross-sectional view of an overclad fiber optic coupler

In the resultant coupler, which is schematically illustrated in FIG. 6, optical fibers $F_1$ and $F_2$ extend within glass overclad tube 0. Those portions of the fibers extending from the tube preferably have protective coating material (not shown in this illustrative embodiment). At least those portions of the fibers within the tube midregion have no coating. The original diameter of the tube is $d_1$. The central portion of the stretched midregion constitutes neckdown region N of diameter $d_2$ where the fiber cores are sufficiently closely spaced for a sufficiently long distance z to effect the desired coupling therebetween. Region N is illustrated as having a constant diameter even though a slight taper exists therein, whereby the longitudinal center of section N exhibits the minimum diameter. Draw ratio R is equal to $d_1/d_2$. Tapered regions T connect the neckdown region with the unstretched end regions of tube 0.

Figure 1:
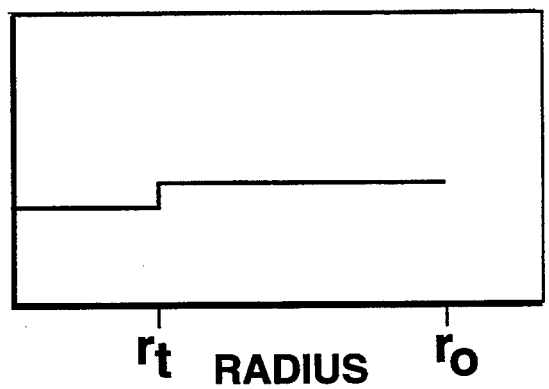
FIG. 1 is graph of the chlorine profile of a known WDM coupler fiber.
Figure 2:
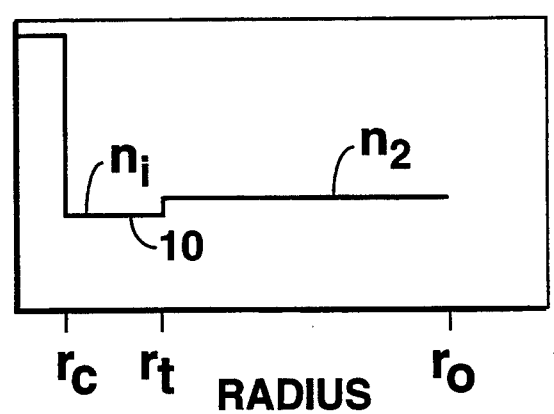
FIG. 2 is a refractive index profile of a known WDM coupler fiber.
Figure 3:
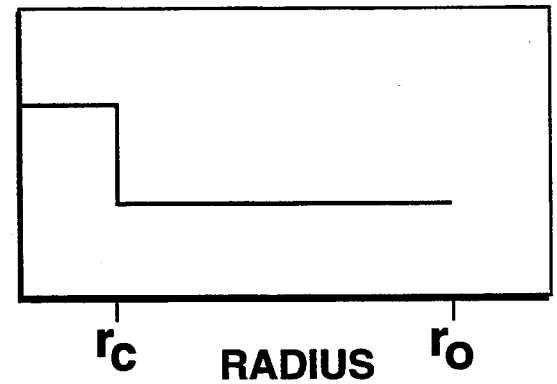
FIG. 3 is a refractive index profile of a standard telecommunication fiber.
Figure 8:
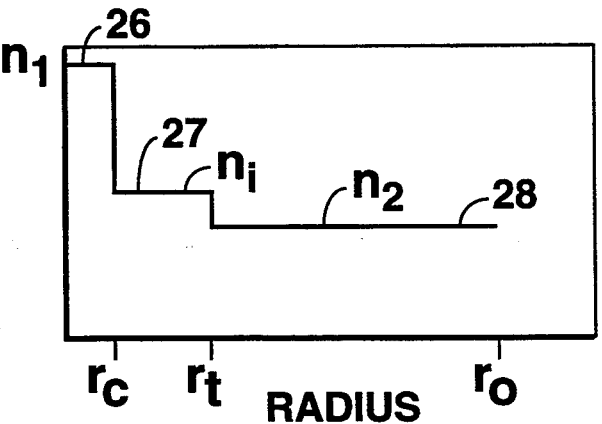
FIG. 8 is a refractive index profile of a coupler fiber designed in accordance with the present invention.
Figure 7:
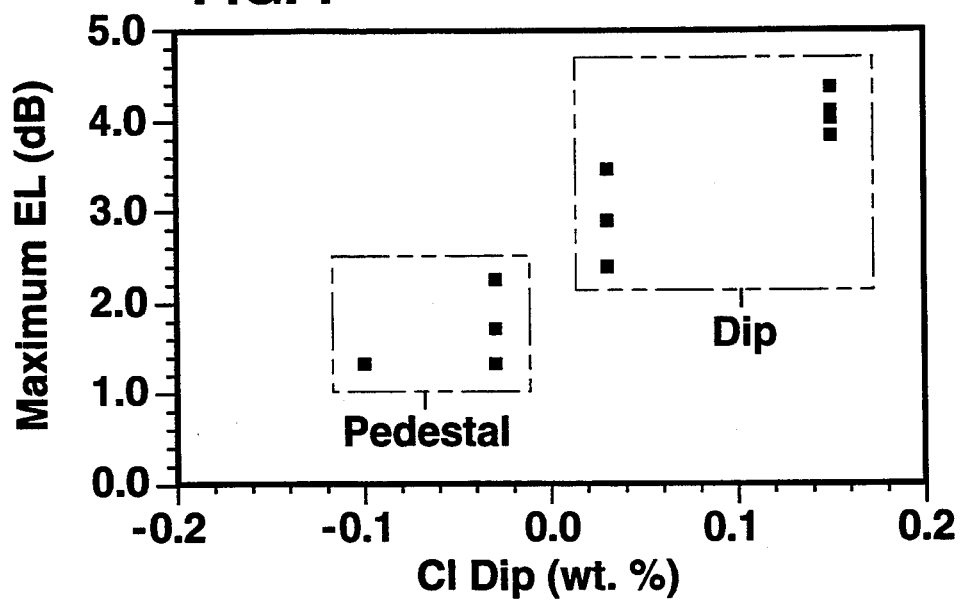
FIG. 7 is a graph of maximum excess loss (from 1200 nm to 1600 nm) for couplers having different values of chlorine dip or pedestal.

An analysis of WDM couplers employing small mode field diameter fibers having different chlorine profile dips had shown that larger chlorine profile dips resulted in couplers having greater excess loss. To further confirm this mechanism, Type B WDM couplers were fabricated with four different small mode field fibers. Each coupler was formed from two identical small mode field diameter fibers that were made by the process described above. Each of the couplers employed fibers having different chlorine concentrations up to a radius of approximately 10 μm. Beyond a radius of approximately 10 μm the chlorine concentrations were essentially the same. At radii up to approximately 10 μm each type of fiber had a chlorine level less than the outer chlorine level (a dip) or a chlorine level greater than the outer chlorine level (a pedestal). Included were fibers with a large dip in the chlorine level (as in curve 20 of FIG. 5) and fibers with a pedestal like that shown in curve 22 of FIG. 5. In FIG. 7 the maximum excess loss over the wavelength range 1200 to 1600 nm is shown as a function of the amount of dip in the chlorine level at small radii (approximately 10 μm). Negative values of dip correspond to a pedestal. The data shows a clear trend to lower loss for smaller dips, and even better loss for pedestals. Therefore, a feature of this invention is to employ for use in fiber optic couplers optical fibers having a refracative index pedestal between the core and cladding. As shown in FIG. 8, the pedestal 27 has a maximum refractive index $n_i$ that is intermediate the maximum refractive index $n_1$ of core 26 and refractive index $n_2$ of cladding 28. For the sake of simplicity, core 26 and pedestal 27 are illustrated as being constant index regions of the fiber. Alternatively, core 26 and pedestal 27 could have a varying refractive index profile such as a gradient profile, a profile formed of a plurality of steps, or the like.

Numerical modeling was done to determine some aspects of an optimal design for this invention. The modeling tool that was used was as described U.S. Pat. No. 4,877,300, where the $LP_{01}$ and $LP_{11}$ propagation constant difference is calculated for a variety of geometries (variation in size along the taper).

Figure 9:
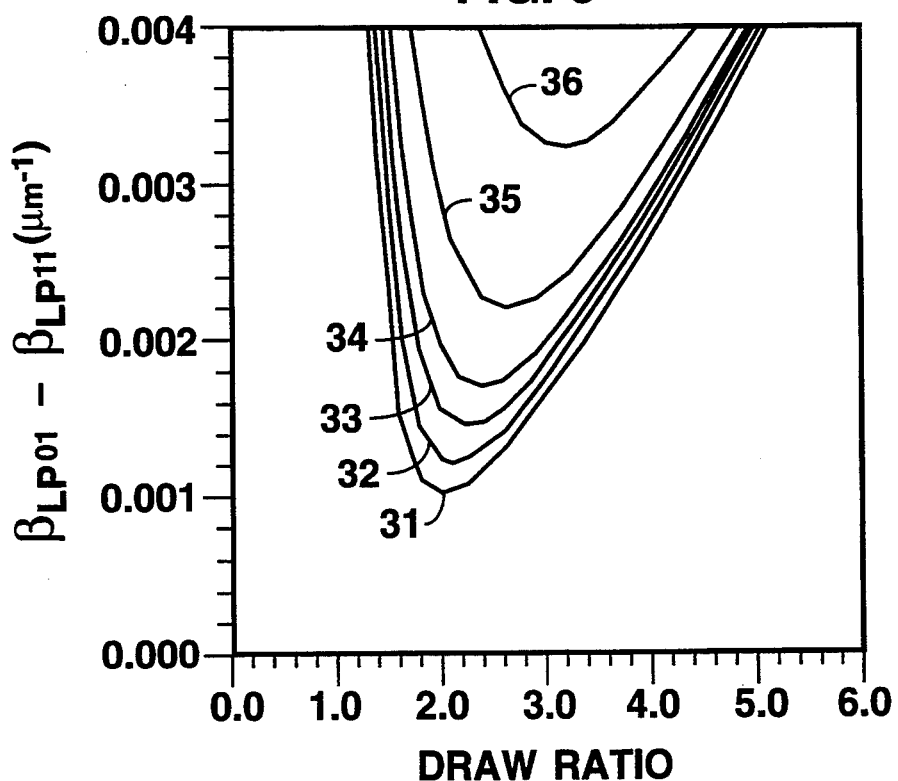
FIG. 9 is a graph wherein the theoretical variation of $\delta\beta$ is plotted as a function of draw ratio, the parameter being $\Delta_{pedestal}$.

FIG. 9 shows the theoretical variation of $\delta\beta$ at different values of $\Delta_{pedestal}$, $\delta\beta$ representing the difference between the propagation constants of the lowest $LP_{01}$ and the next highest $LP_{11}$ modes and being equal to $(\beta_{LP01}-\beta_{LP11})$. Larger minimum values of $\delta\beta$ result in better excess loss performance. FIG. 9 shows that greater excess loss improvement can be achieved at larger values of $\Delta_{pedestal}$. The curves of FIG. 9 correspond to the refractive index profiles (pedestals or dips) identified in Table 1.

TABLE 1

| Curve | Profile |
|---|---|
| 36 | 0.16% $\Delta_{ped}$ Pedestal |
| 35 | 0.08% $\Delta_{ped}$ Pedestal |
| 34 | 0.04% $\Delta_{ped}$ Pedestal |
| 33 | 0.02% $\Delta_{ped}$ Pedestal |
| 32 | Flat (no pedestal nor dip) |
| 31 | 0.02% $\Delta_{ped}$ Dip |

An approximate relation between chlorine concentration differences and index Δ caused by those differences is $$\Delta = \frac{Cl \text{ difference (wt. \%)}}{10}$$

Further, the curves 31 to 33 approximately represent the span of chlorine differences experimentally measured, as shown in FIG. 7.

Figure 10:
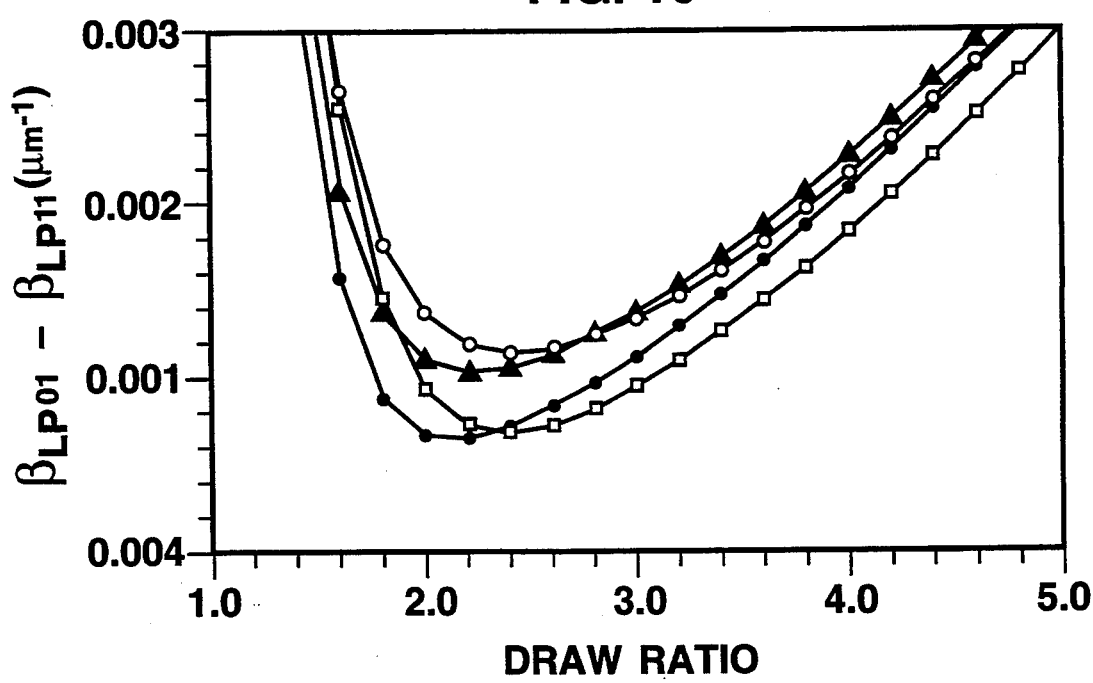
FIG. 10 is a graph wherein the theoretical variation of $\delta\beta$ is plotted as a function of draw ratio, the parameter being pedestal radius.

FIG. 10 shows the variation of $\delta\beta$ with pedestal radius for a $\Delta_{pedestal}$ value of 0.03%. The curves of FIG. 10 correspond to the pedestal radii identified in Table 2. A radius of 20 to 25 μm was optimum for greatest effectiveness. Similar values of pedestal radius were obtained for other values of $\Delta_{pedestal}$.

TABLE 2

| Curve | Pedestal (Dip) Radius |
|---|---|
| 41 | 10 μm |

TABLE 2-continued

| Curve | Pedestal (Dip) Radius |
|---|---|
| 42 | - 20 μm |
| 43 | 30 μm |
| 44 | 40 μm |

The optimal values of $\Delta_{pedestal}$ and pedestal radius set forth above were derived without considering such factors as mode field diameter and cutoff wavelength. However, the presence of a pedestal in the refractive index profile of a fiber results in a different mode field diameter and cutoff wavelength than would be exhibited by the fiber in the absence of the pedestal.

These other fiber characteristics could be important in the designing of a type A fiber erbium amplifier WDM coupler, for example, the first coupler fiber of which is matched to a standard telecommunication fiber. Assume that a first end of the second coupler fiber is connected to the pump light source and must propagate light at a wavelength of 980 nm and that the second end of the second fiber is connected to the gain fiber. The second coupler fiber should be designed such that its cutoff wavelength does not fall below some specified wavelength, eg. 980 nm. Moreover, the mode field diameter of the relevant fiber should substantially match that of the gain fiber.

Therefore, in addition to considering the optimal parameters for loss, limitations due to cutoff wavelength and mode field diameter were also considered.

Figure 11:
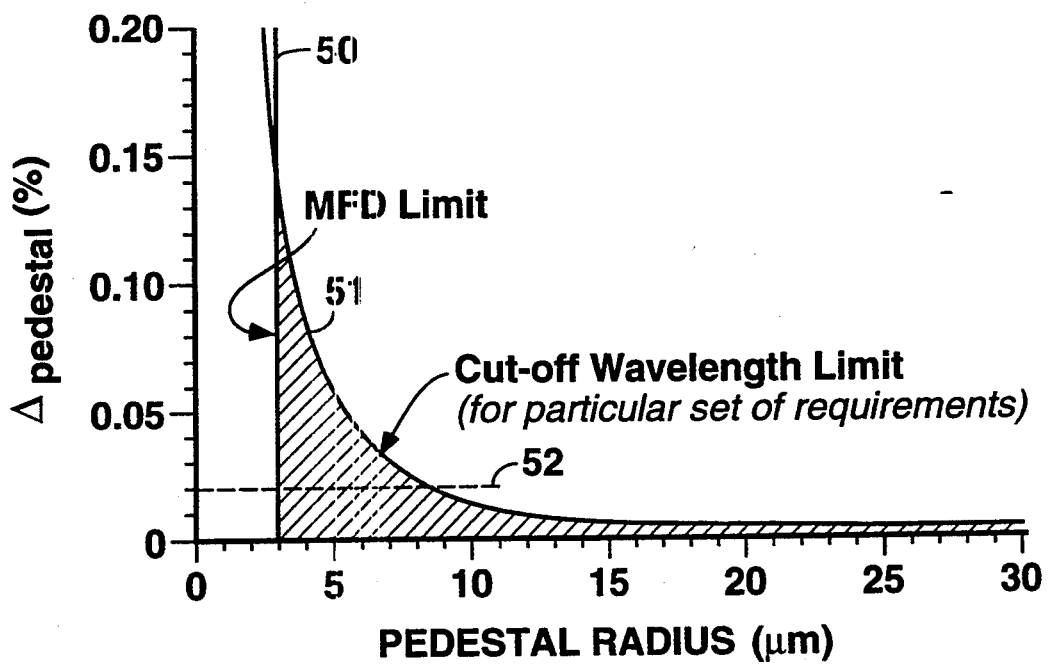
FIG. 11 is a graph wherein the theoretical variation of $\Delta_{pedestal}$ is plotted as a function of pedestal radius, mode field diameter and cutoff limits being shown.

A summary of the limits derived with respect to mode field diameter limit (line 50) and cutoff wavelength limit (line 51) for the second coupler fiber is given in FIG. 11, where both of these limits are shown. The pedestal characteristics of the fiber must fall within the shaded area. The pedestal values available with chlorine doping are up to about 0.02% (line 52), corresponding to pedestal radii of around 10 μm. However, it is difficult to accurately produce values of $\Delta_{pedestal}$ lower than 0.01% with chlorine doping. The results on $\delta\beta$ values give competing trends here. Larger $\Delta_{pedestal}$ values are more effective, pushing the optimum result to the upper left part of the shaded region, but the previously derived optimum radius would indicate a value towards the right end of the region. In fact, the large $\Delta_{pedestal}$, small radius end is somewhat better in performance from a loss perspective, as shown in FIG. 12.

Figure 12:
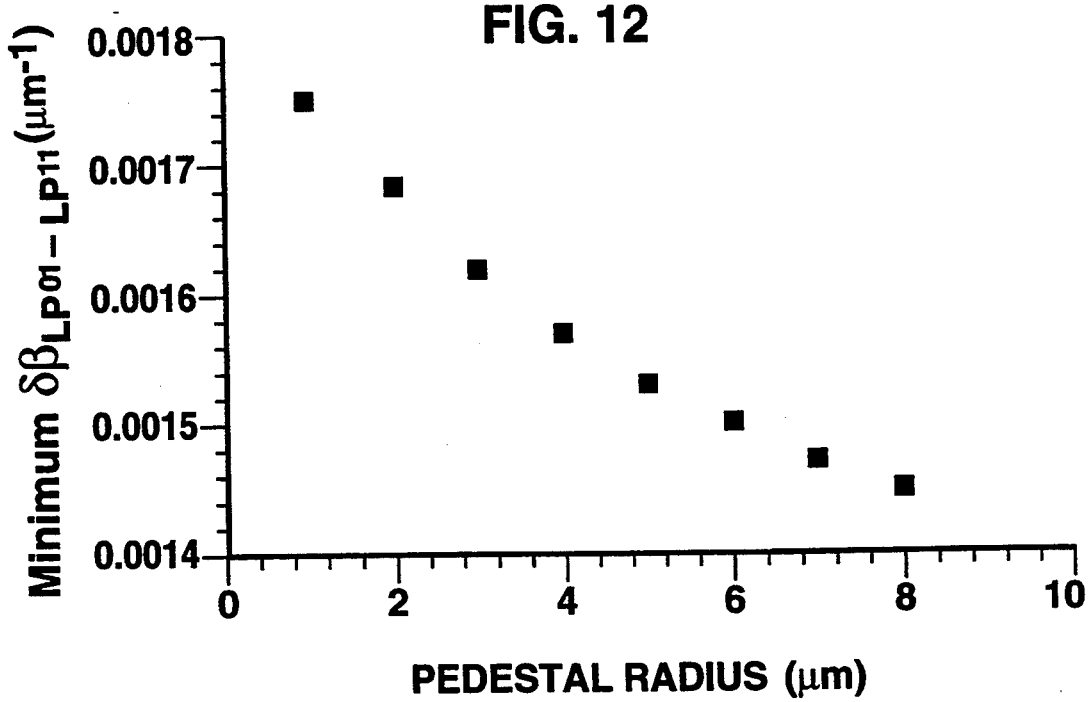
FIG. 12 is a graph wherein the theoretical variation of minimum $\Delta\beta$ is plotted as a function of pedestal radius $a_{pedestal}$ for a $\Delta_{pedestal}$ value determined by $$\Delta_{pedestal} = (0.115 \, \mu m)/a_{pedestal})^2$$

While the relative improvement in excess loss from the variation seen here cannot be exactly quantified, the excess loss improvement seen in the above-described type B coupler experiment (FIG. 7) was the result of an increase in $\delta\beta$ of about 0.0004 $\mu m^{-1}$, similar to the variation seen in FIG. 12.

Chlorine is a preferred dopant for $\Delta_{ped}$ values less than 0.02% since chlorine is present during consolidation to dry the porous core preform. Its concentration is merely increased to a level greater than that employed during consolidation of the outer cladding in order to form a pedestal. However, other doping techniques must be employed to achieve $\Delta_{ped}$ values greater than about 0.02%.

Dopants other than chlorine can be used to create fibers having pedestal 27 (FIG. 8) in their refractive index profile. The dopant that is employed to form core 26 can also be used to form the pedestal. Germania, which is commonly used as a dopant for optical fiber cores, could be used to form both core 26 and pedestal 27. Moreover, there are many other refractive index increasing dopants that could be used to form the core and/or pedestal. Pedestal 27 could also be formed of silica, cladding 28 being formed of silica doped with a refractive index decreasing dopant such as fluorine or boron.

Discussed herein have been couplers wherein less than all fibers have refractive index pedestals and couplers wherein fibers have identical refractive index pedestals. The invention also applies to couplers wherein more than one coupler fiber has a refractive index pedestal, not all pedestals being identical.

We claim:

1. A fiber optic coupler comprising
a plurality of single-mode optical fibers, each having a biconical taper section, the taper sections of said fibers extending in contiguous relationship to form a coupling region, each of said fibers having a core surrounded by a cladding of refractive index lower than that of said core, at least one of said fibers having a refractive index pedestal having a maximum refractive index $n_i$ between said core and cladding, wherein $n_1 > n_i > n_2$, $n_1$ being the maximum refractive index of the core of said at least one fiber and $n_2$ being the refractive index of the cladding of said at least one fiber, those portions of said fibers that are in said coupling region being surrounded by a medium having a refractive index $n_3$, wherein $n_3 < n_2$.

2. A fiber optic coupler in accordance with claim 1 wherein the maximum radius of pedestal is 25 μm.

3. A fiber optic coupler in accordance with claim 1 wherein the radius of pedestal is between 20 and 25 μm.

4. A fiber optic coupler in accordance with claim 1 wherein said at least one fiber contains chlorine, the amount of chlorine in the pedestal of said at least one fiber being greater than the amount of chlorine in the cladding thereof.

5. A fiber optic coupler in accordance with claim 1 wherein the core of said at least one fiber contains silica and a refractive index-increasing dopant, and wherein said pedestal contains silica and a refractive index-increasing dopant.

6. A fiber optic coupler in accordance with claim 5 wherein said core and said pedestal contain the same refractive index-increasing dopant.

7. A fiber optic coupler in accordance with claim 5 wherein said core and said pedestal contain different refractive index-increasing dopants.

8. A fiber optic coupler in accordance with claim 1 wherein the cladding of said at least one fiber contains a refractive index-decreasing dopant in an amount sufficient to decrease its refractive index to a value lower than $n_i$.

9. A fiber optic coupler in accordance with claim 1 wherein said plurality of fibers are identical.

10. A fiber optic coupler in accordance with claim 1 wherein each of said plurality of fibers has a refractive index pedestal between said core and cladding, the refractive index of the pedestal being greater than that of the cladding of the fiber and less than that of the core of the fiber.

11. A fiber optic coupler in accordance with claim 1 wherein said at least one optical fiber is different from the remainder of said plurality of fibers.

12. A fiber optic coupler in accordance with claim 1 wherein said medium comprises an elongated body of matrix glass having two end regions and a midregion, said optical fibers extending longitudinally within said body and being fused together along with the midregion of said body, the diameter of the central portion of said midregion being smaller than the diameters of said end regions, said central portion of said midregion constituting said coupling region.

13. A fiber optic coupler in accordance with claim 1 wherein $\Delta_{pedestal}$ is less than 0.15%, wherein $\Delta_{pedestal}$ equals $(n_i^2 - n_2^2)/n_i^2$.

* * * * *